US012621500B1

(12) United States Patent
Guo et al.

(10) Patent No.: US 12,621,500 B1
(45) Date of Patent: May 5, 2026

(54) FAST SEARCH FOR PARAMETERS OF AN IN-LOOP DERINGING FILTER

(71) Applicant: Zoom Video Communications, Inc., San Jose, CA (US)

(72) Inventors: Yi Guo, Hangzhou (CN); Zhichu He, Hangzhou (CN); Rui Li, Hangzhou (CN); Bo Ling, Saratoga, CA (US); Jing Wu, Hangzhou (CN); Minxia Yang, Hangzhou (CN); Shiyan Zhang, Hangzhou (CN); Yichen Zhang, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 291 days.

(21) Appl. No.: 18/200,845

(22) Filed: May 23, 2023

(51) Int. Cl.
| | |
|---|---|
| *H04N 19/86* | (2014.01) |
| *H04N 19/117* | (2014.01) |
| *H04N 19/174* | (2014.01) |
| *H04N 19/186* | (2014.01) |

(52) U.S. Cl.
CPC ........... *H04N 19/86* (2014.11); *H04N 19/117* (2014.11); *H04N 19/174* (2014.11); *H04N 19/186* (2014.11)

(58) Field of Classification Search
CPC .... H04N 19/86; H04N 19/117; H04N 19/157; H04N 19/172; H04N 19/176; H04N 19/52; H04N 19/82; H04N 19/96; H04N 19/107; H04N 19/119

USPC ......................................................... 375/240
See application file for complete search history.

(56) References Cited

U.S. PATENT DOCUMENTS

2020/0128243 A1* 4/2020 Wang ................... H04N 19/159
2021/0211737 A1* 7/2021 Helmrich ............. H04N 19/172

OTHER PUBLICATIONS

Midtskogen et al., "The AV1 Constrained Directional Enhancement Filter (CDEF)", Steiner Midtskdogen Cisco, ICASSP 2018, Alliance for Open Media, Mozilla, 17 pages.
(Continued)

*Primary Examiner* — Masum Billah
(74) *Attorney, Agent, or Firm* — Kilpatrick Townsend & Stockton LLP

(57) ABSTRACT

Techniques for method for filtering artifacts from digital video are disclosed. In an example, a method includes accessing a video stream that includes a block with sub-blocks. The method includes, for each candidate filter strength parameter of a set of candidate filter strength parameters associated with the block, filtering each sub-block using a filter having the candidate filter strength parameter, creating a filtered block by combining the filtered sub-blocks, and calculating, for the filtered block, a distortion error measurement between a corresponding source block and the filtered block. The method includes selecting the filter strength parameters associated with a lowest distortion error measurement of the distortion error measurements. The method includes applying the selected filter strength parameters to an in-loop deringing filter to generate a filtered block of video.

20 Claims, 9 Drawing Sheets

500

FRAME 501
BLOCKS 502A-N
FILTERED BLOCK 503
FINAL BLOCK 504
FRAME 505
BLOCKS 506A-N
DEBLOCKING FILTER 512
DERINGING FILTER 514
ITERATE OVER ALL BLOCKS IN A FRAME

(56)  References Cited

OTHER PUBLICATIONS

Haughton et al., "AV1 Bitstream & Decoding Process Specification", Copyright 2018, The Alliance For Open Media, 681 pages.
Chen et al., "An Overview of Core Coding Tools in the AV1 Video Codec", 5 pages.
Barr et al., "Predicting Chroma from Luma in AV1", Nov. 10, 2017, 8 pages.
Valin et al., The AV1 Constrained Directional Enhancement Filter (CDEF), Oct. 28, 2017, 5 pages.

* cited by examiner

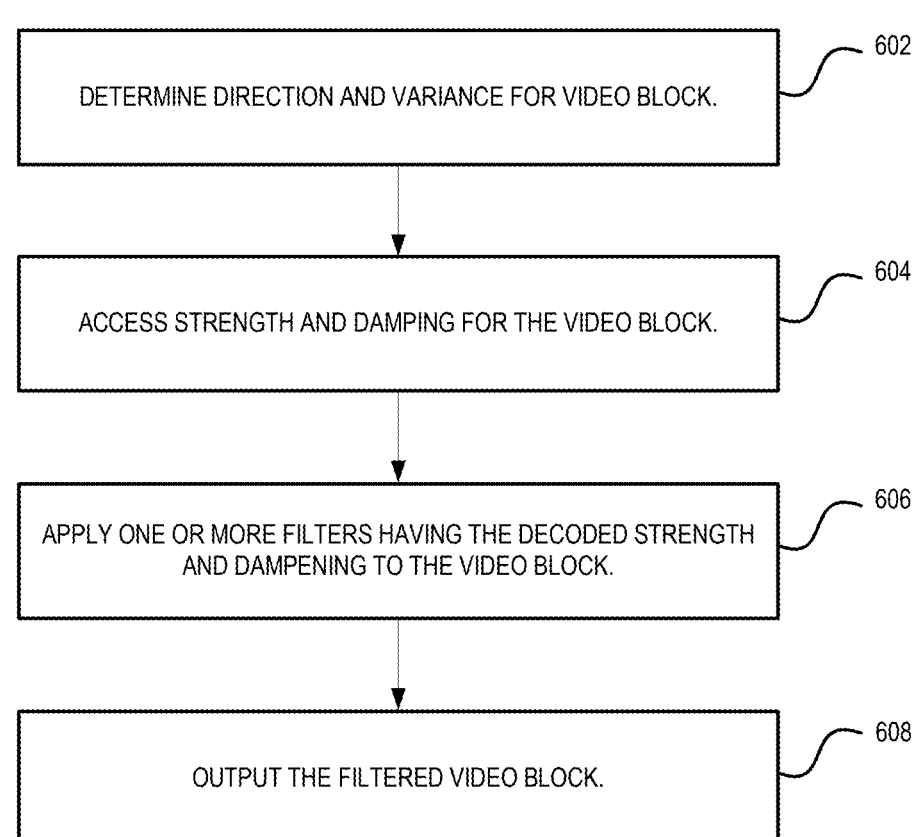
DETERMINE DIRECTION AND VARIANCE FOR VIDEO BLOCK. ~ 602
ACCESS STRENGTH AND DAMPING FOR THE VIDEO BLOCK. ~ 604
APPLY ONE OR MORE FILTERS HAVING THE DECODED STRENGTH AND DAMPENING TO THE VIDEO BLOCK. ~ 606
OUTPUT THE FILTERED VIDEO BLOCK. ~ 608
*FIG. 6*

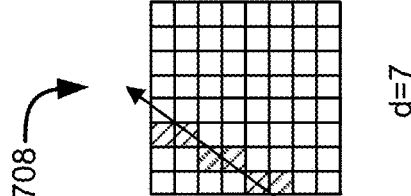
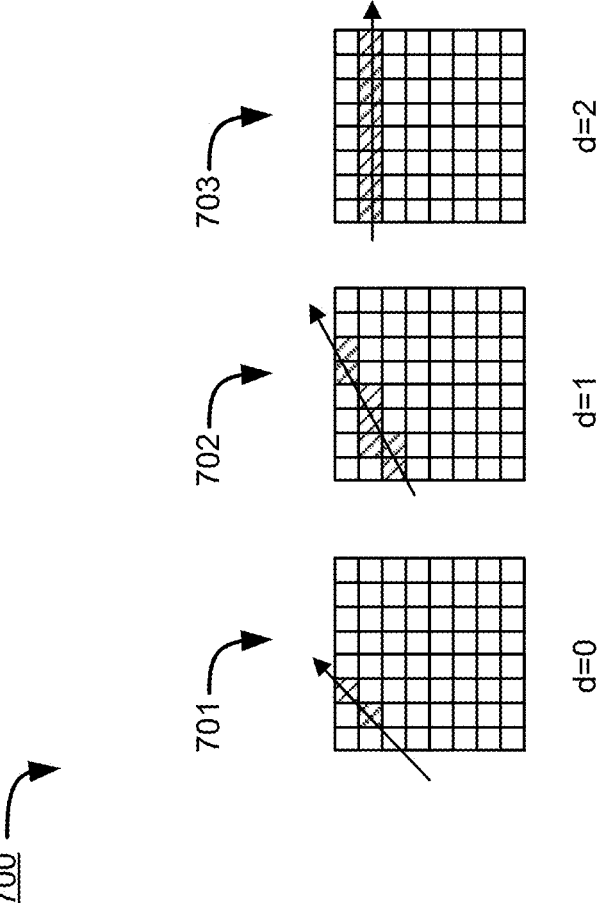
FIG. 7

800

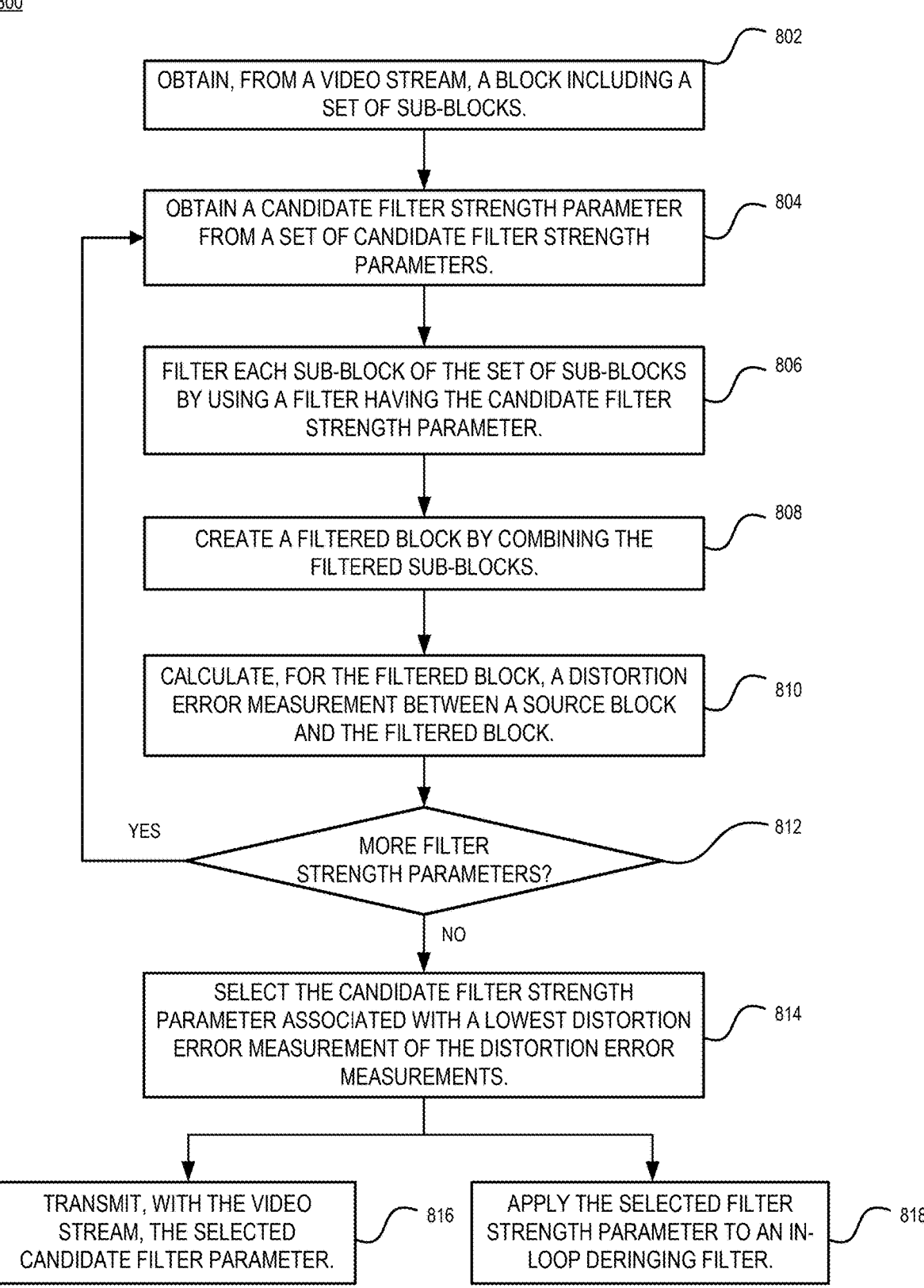

802

OBTAIN, FROM A VIDEO STREAM, A BLOCK INCLUDING A SET OF SUB-BLOCKS.

804

OBTAIN A CANDIDATE FILTER STRENGTH PARAMETER FROM A SET OF CANDIDATE FILTER STRENGTH PARAMETERS.

806

FILTER EACH SUB-BLOCK OF THE SET OF SUB-BLOCKS BY USING A FILTER HAVING THE CANDIDATE FILTER STRENGTH PARAMETER.

808

CREATE A FILTERED BLOCK BY COMBINING THE FILTERED SUB-BLOCKS.

810

CALCULATE, FOR THE FILTERED BLOCK, A DISTORTION ERROR MEASUREMENT BETWEEN A SOURCE BLOCK AND THE FILTERED BLOCK.

812

YES

MORE FILTER STRENGTH PARAMETERS?

NO

814

SELECT THE CANDIDATE FILTER STRENGTH PARAMETER ASSOCIATED WITH A LOWEST DISTORTION ERROR MEASUREMENT OF THE DISTORTION ERROR MEASUREMENTS.

TRANSMIT, WITH THE VIDEO STREAM, THE SELECTED CANDIDATE FILTER PARAMETER.

816

APPLY THE SELECTED FILTER STRENGTH PARAMETER TO AN IN-LOOP DERINGING FILTER.

FAST SEARCH FOR PARAMETERS OF AN IN-LOOP DERINGING FILTER

FIELD

This disclosure generally relates to video coding. More specifically, but not by way of limitation, this disclosure relates to improved techniques for determining optimal parameters for video filters that reduce artifacts in coded video.

BRIEF DESCRIPTION OF THE DRAWINGS

FIG. 6 is a flowchart of an example of a method for performing filtering of video by using an in-loop deringing filter.

FIG. 7 illustrates different directions identified in a video block.

FIG. 8 is a flowchart of an example of a method for determining a strength parameter for use in in-loop filtering of video.

DETAILED DESCRIPTION

Figure 1:
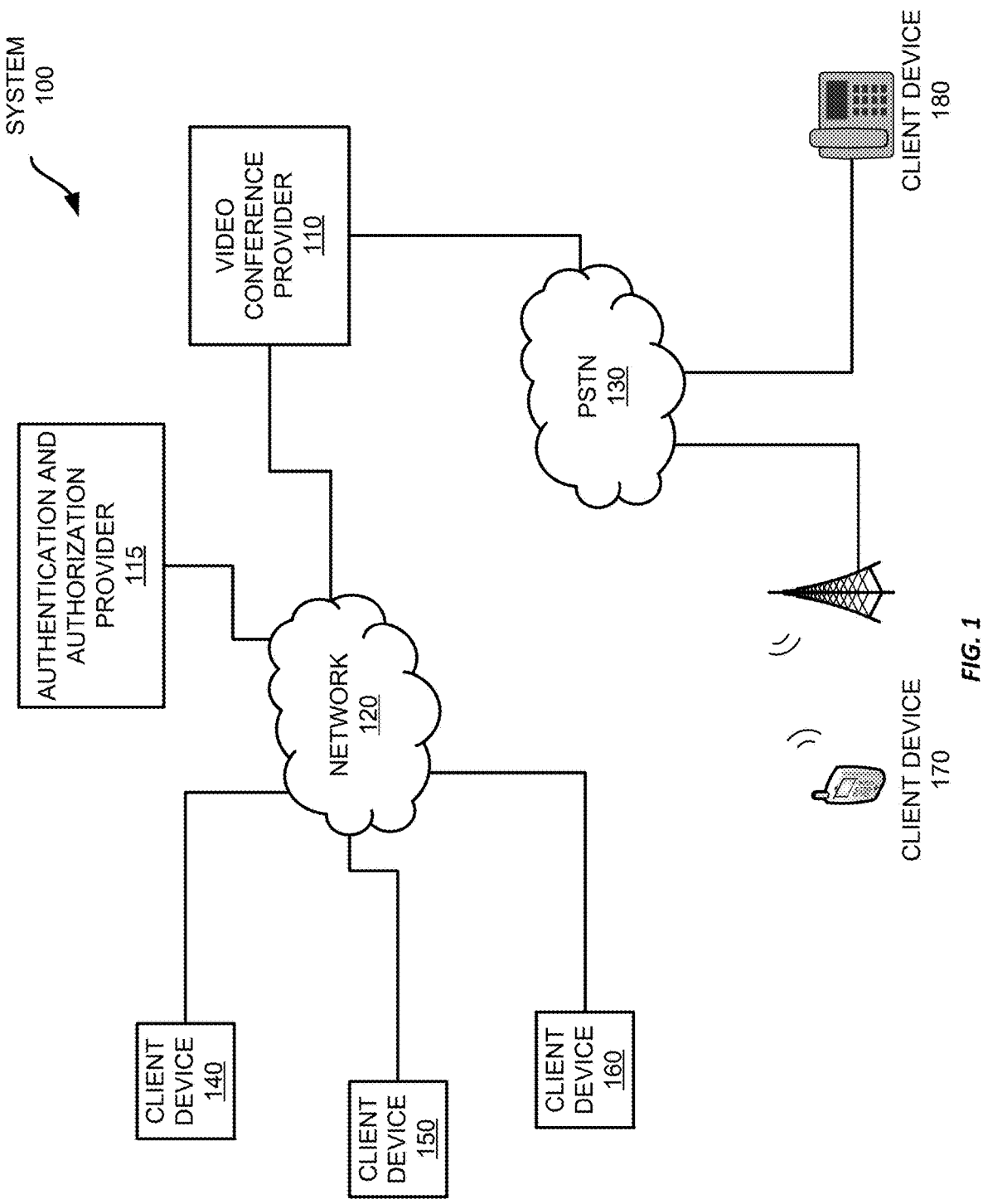
FIG. 1 depicts an example system for providing video conferencing functionality to client devices.

Disclosed solutions relate to improved digital video coding, specifically improved techniques for determining optimum parameters used by in-loop deringing filters. Numerous applications such as online video conferencing rely on video coding. But video coding can result in undesirable artifacts such as ringing. Ringing appears as spurious signals in video frames near sharp transitions such as an edge of an object. Additionally, ringing artifacts can degrade the prediction performance of video encoders.

An In-Loop Deringing Filter (IDF) can be used to reduce these video artifacts. But the effectiveness of an IDF depends on various filter parameters including strength and damping. Filter strength, in particular, can affect video quality. Further, these parameters generally vary by block and therefore are re-calculated in real-time. Therefore, calculating these parameters in real-time uses computing resources and can introduce delay.

Accordingly, disclosed solutions determine an optimum filter strength from a set of existing strength candidate parameters while meeting real-time performance constraints. With these improved filter parameters, video quality is improved, and the use of processing resources in applications that employ video encoding and video decoding is reduced. Disclosed solutions can be used by a video encoder, for example, to improve deblocking filtering of reference blocks of video used for prediction, and can be used by a decoder that decodes a bitstream encoded by a video encoder using a deblocking filter.

The following illustrative example is provided to introduce the reader to the general subject matter discussed herein, but the disclosure is not limited to this example. In the example, to reduce artifacts, a video encoder in a video conferencing application determines an IDF strength param eter for an encoded video block (e.g., a two-dimensional set of pixels that is part of a video frame).

Before filtering, the video encoder evaluates each candidate filter strength parameter of the set of candidate filter strength parameters. For instance, the video encoder applies a first candidate filter strength parameter to each sub-block (i.e., part of the block) of video. The video encoder then reassembles the sub-blocks into a block, and calculates a resulting error relative to a corresponding source video block (i.e., before coding). This process continues for each candidate filter strength parameter. Finally, the video encoder selects the candidate filter strength parameter that resulted in the lowest error. The resulting candidate filter strength parameter can be used by the video encoder and/or transmitted, or signaled, in the encoded video frame and later used by a video decoder.

Techniques are described herein in the context of improved in-loop deringing filters for use in video conferencing systems. But those of ordinary skill in the art will realize that the following description is illustrative only and is not intended to be in any way limiting. For instance, disclosed techniques can be employed in video encoding or decoding in other contexts.

Referring now to FIG. 1, FIG. 1 shows an example, system 100, that provides video conferencing functionality to various client devices. The system 100 includes a chat and video conference provider 110 that is connected to multiple communication networks 120, 130, through which various client devices, 140-180, can participate in video conferences hosted by the chat and video conference provider 110. For example, the chat and video conference provider 110 can be located within a private network to provide video conferencing services to devices within the private network, or it can be connected to a public network (e.g., the internet) so it may be accessed by anyone. Some examples may even provide a hybrid model in which a chat and video conference provider 110 may supply components to enable a private organization to host private internal video conferences, or to connect its system to the chat and video conference provider 110 over a public network.

The system optionally also includes one or more authentication and authorization providers (e.g., authentication and authorization provider 115) which can provide authentication and authorization services to users of the client devices 140-160. Authentication and authorization provider 115 may authenticate users to the chat and video conference provider 110, and manage user authorization for the various services provided by chat and video conference provider 110. In this example, the authentication and authorization provider 115 is operated by a different entity than the chat and video conference provider 110, though in some examples, they may be the same entity.

Figure 2:
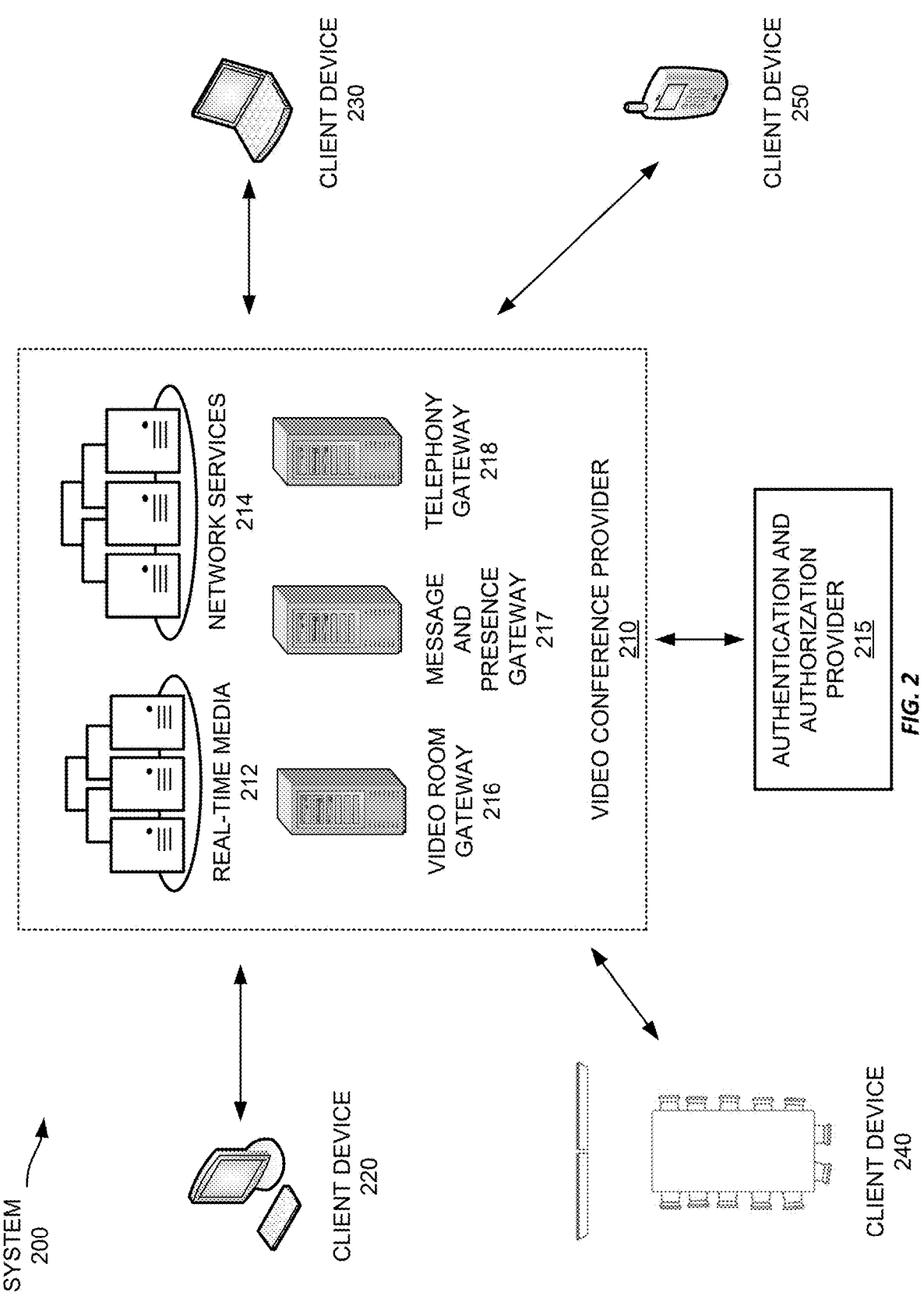
FIG. 2 depicts an example system in which a video conference provider provides video conferencing functionality to various client devices.

Chat and video conference provider 110 allows clients to create video conference meetings (or "meetings") and invite others to participate in those meetings, as well as perform other related functionality, such as recording the meetings, generating transcripts from meeting audio, generating summaries and translations from meeting audio, manage user functionality in the meetings, enable text messaging during the meetings, create and manage breakout rooms from the virtual meetings, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which partici pants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common video conference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls (e.g., using a headset and microphone). Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120, and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device (e.g., client devices 140-160) may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality, such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices (e.g., client devices 170-180) the user may place a telephone call to the chat and video conference provider 110 to access video conference services. After the call is answered, the user may provide information regarding a video conference meeting (e.g., a meeting identifier ("ID"), a passcode or password, etc.) to allow the telephony device to join the meeting and participate using audio devices of the telephony device (e.g., microphone(s) and speaker(s)), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information (e.g., a meeting identifier and passcode) but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110, or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides video conferencing functionality to client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210, generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateway servers 218. Each of these servers 212-218 is connected to one or more communications networks to enable them to collectively provide access to and participation in one or more video conference meetings to the client devices 220, 230, 240, and 250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240, and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory, and network I/O as well as network parameters such as packet loss, latency, and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities (e.g., client device

250), the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers, e.g., cloud recording servers) for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting, and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises (e.g., at a business or other organization). For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure (e.g., internet backbone network(s)) that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy (e.g., for specific regions or localities) to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to the network services servers 214. The client device may then provide access credentials for a user (e.g., a username and password or single sign-on credentials) to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214, but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate (e.g., by deleting a corresponding passcode for the meeting from the meeting record) or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones, and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Telephony gateway servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device (e.g., by sending dual-tone multi-frequency ("DTMF") audio streams to the telephony gateway server 218). The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device (e.g., a microphone and speaker) for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
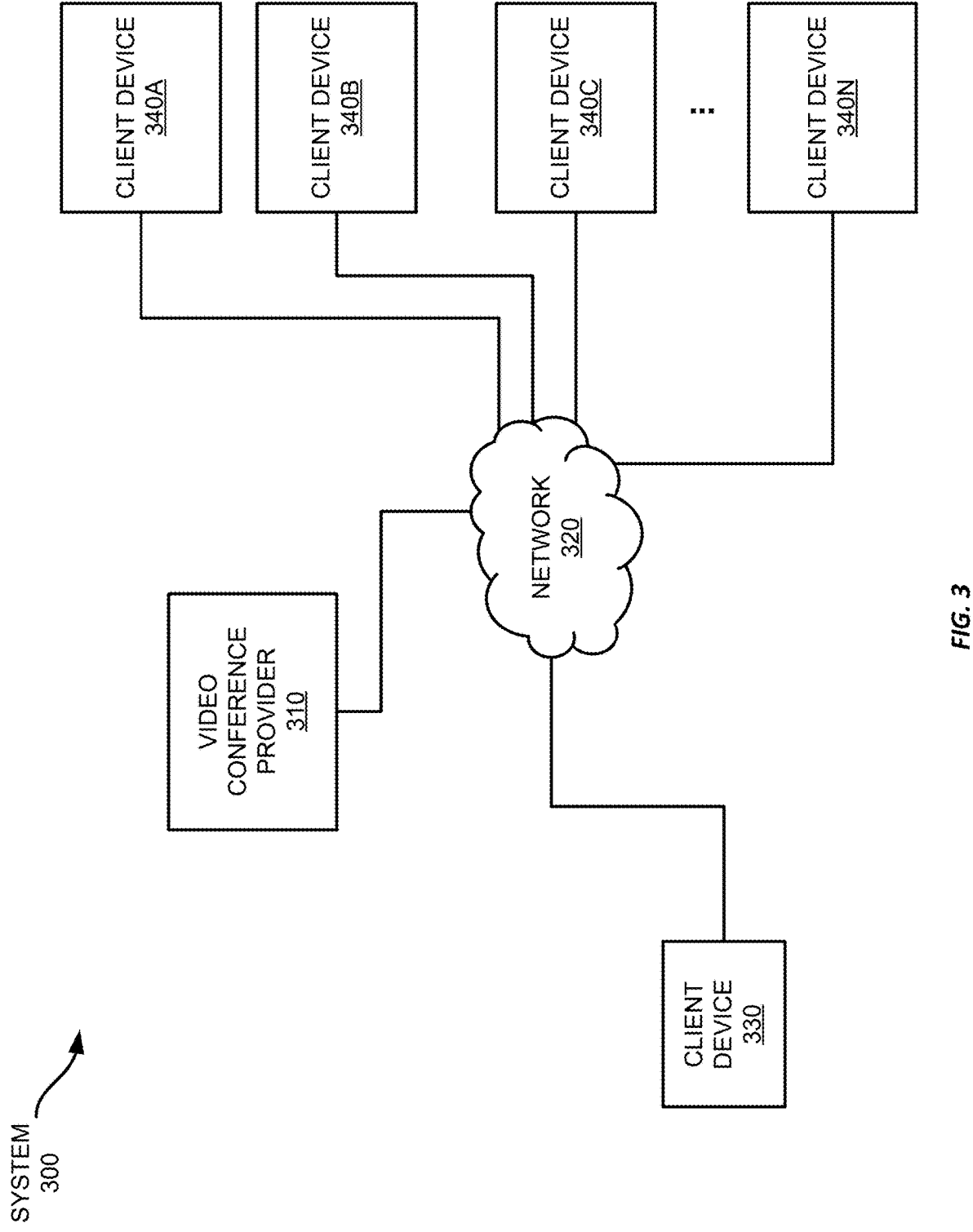
FIG. 3 depicts an example system for video conferencing.

FIG. 3 depicts an example system 300 for video conferencing. System 300 includes a video conference provider 310 and multiple client devices 330 and 340A-N that are connected to the video conference provider 310 via network 320. In this example, the network 320 is the internet; however, any communications network or combination of communications networks may be employed. While system 300 is depicted as including multiple client device 330, 340A-N, it should be appreciated that some systems may not include any client devices at any particular time, and that the number of client devices can change.

To start a video conference, client device 330, a host, connects to the video conference provider 310 and begins a main meeting ("meeting") at the video conference provider 310, such as by beginning a scheduled meeting, generally as described above with respect to FIGS. 1 and 2. The video conference provider 310 may create and manage the meeting as discussed above with respect to FIGS. 1-2. Any of client devices 330 or 340A-N may start or join additional meetings.

Video conference provider 310 and multiple client devices 330 and 340A-N can use the improved video coding techniques disclosed herein, including improved search for IDF parameters such as filter strength. For example, client device 340A encodes a video stream and uses the improved filter strength parameter techniques disclosed herein. For instance, client device 340A determines a strength parameter for one or more blocks of video from the video stream and transmits the determined strength parameters in the encoded bitstream. An example of a method for determining the strength parameter is shown with respect to FIG. 8. Then, the encoded bitstream is transmitted from client device 340A, either directly to client device 340B or via video conference provider 310 to client device 340B. Client device 340B receives the encoded video from client device 340A and decodes the video. Client device 340B, to improve image quality, accesses the encoded strength parameters and then filers the decoded video using an IDF using the strength parameters. An example of a method for filtering is shown with respect to FIG. 6. In so doing, the artifacts of video coding are reduced.

Figure 4:
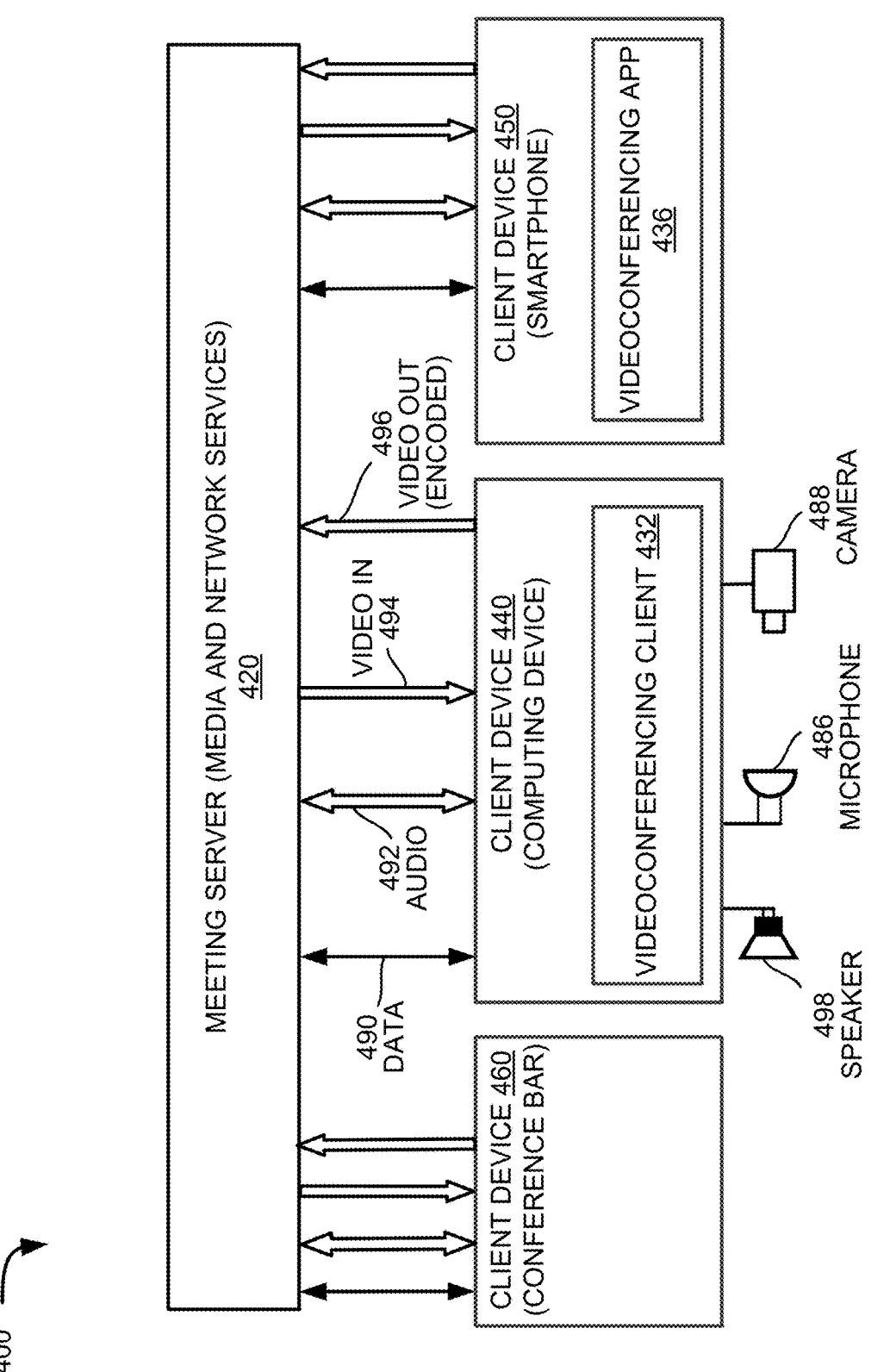
FIG. 4 depicts an example system for video conferencing.

FIG. 4 depicts an example system for video conferencing. FIG. 4 depicts system 400, which includes meeting server 420 and client devices 440, 450, and 460. In the example depicted in FIG. 4, meeting server 420 creates a video conference between client devices 440 and 450. One or more of client devices 440 and 450 can use in-loop deringing with the improved filter parameters discussed herein.

Meeting server 420 may also be referred to as a multi-media router and can be implemented by the real-time media servers 212 working with the network services servers 214. Meeting server 420 can keep track of the status of meetings without constantly exchanging this information with client devices.

Client device 440 in this example is a computing device such as a desktop or notebook computer. Client device 450 in this example is a smartphone but can be any suitable client device. Client device 460 in this example is a conference bar but can be any suitable client device. As an example, client device 460 may be used as the dedicated video conferencing equipment in video conference room 240. In some examples, a conference bar is a unitary device that can be wall or desk mounted. A conference bar can include a webcam, speaker, and microphone all in one and often has connections to add conference table speakers and/or microphones.

The various hardware configurations in use in a system, such as system 400, may result in video input signals from various devices. These may include wired webcams connected to local computing devices via USB, cameras internal to notebook computers, tablet computers, smartphones, and conference bars or other kinds of dedicated conference room video conferencing equipment. Video signals may also be generated internal to a computing device through screen sharing of documents, images, or incoming video feeds.

In system 400, client devices can maintain an active data connection 490 for any video or audio conference in which the host client device is participating. These data connections are illustrated with the single width, two-headed arrows in FIG. 4. The data connections are used for control, presence indication, chat, and other similar functions and can be maintained using TCP. Additionally, two-way audio streams carry audio between the meeting server 420 and the client devices. The two-way audio streams are shown with a double width, bidirectional arrow such as that shown for audio stream 492.

The encoders in system 400 can accept sound originating from a camera connected to, built in to, or otherwise associated with the respective client device. For purposes of this example, client devices 450 and 460 have built-in microphones, speakers, and cameras, while client device 440 has an externally connected microphone 486, an externally connected camera 488, and an externally connected speaker 498. Alternatively, the microphone 486 may be separate from the speaker 498, for example, a desk or boom microphone, or a microphone that is part of the camera 488. A digital stream including encoded video frames is delivered to meeting server 420 as part of the A/V stream after encoding.

Video received from the meeting server 420 at each client device is illustrated with a double-width, single-ended arrow such as that shown for video input from the network to client device 440, video stream 494. Video streams outgoing from the client devices, which are encoded by the encoder modules using the techniques disclosed herein, are illustrated by a similar double-width, single-ended arrow such as that shown for outgoing video stream 496. Audio and video streams, including the images and frames of outgoing video, can be transmitted over the network using UDP. In an example, video captured by camera 488 is encoded by video conferencing client 432.

Video conferencing client 432 can optionally employ strength parameter determination using the techniques described herein. The video is transmitted, as shown by video out 496, and can be received by client device 450 and provided to video conferencing application 436, which in turn decodes the video optionally and applies disclosed in-loop deringing filtering.

Figure 5:
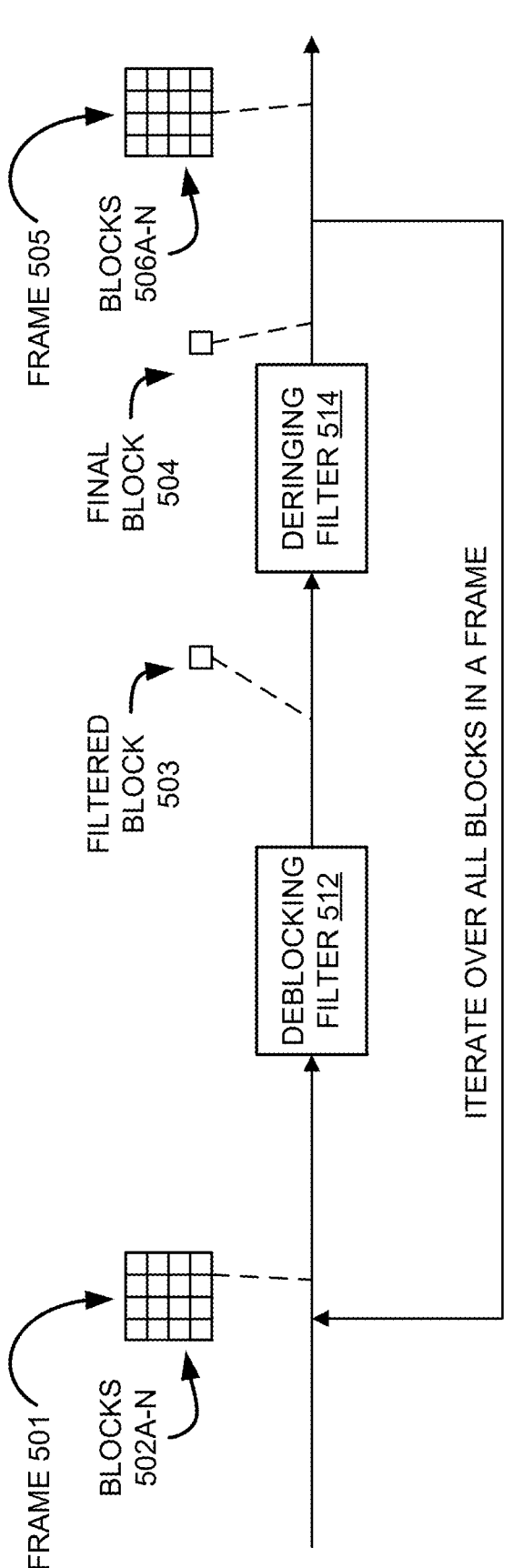
FIG. 5 depicts an example video filter.

FIG. 5 depicts an example of a video filter system 500. In the example depicted in FIG. 5, video filter system 500 receives a video frame 501, performs deblocking and/or deringing filtering to each block of the video frame, reassembles the blocks into a new video frame 505, and outputs video frame 505.

The operations discussed with respect to FIG. 5 can be performed in the encoder and/or decoder context, by any system, for instance, video conference provider 310 and multiple client devices 330 and 340A-N as discussed with respect to FIG. 3, or meeting server 420 and client devices 440, 450, and 460 as discussed with respect to FIG. 4.

Video frame 501 includes blocks 502A-N. The size of the blocks 502A-N can vary by video standard and by configuration. Examples of block sizes include, but are not limited to, 64×64 pixels or 32×32 pixels. Examples of relevant video standards include, but are not limited to, the High Efficiency Video Coding codec (HEVC) and the AOMedia Video 1 (AV1) codec.

Continuing the example, deblocking filter 512 receives block 502A of video frame 501. A deblocking filter is applied to compressed video to improve visual quality and prediction performance. Deblocking filter 512 performs one or more filtering operations on the block 502, outputs block 503 and provides block 503 to deringing filter 514.

Deringing 514 filter removes additional video artifacts. As discussed above, deringing depends on various parameters including a determined direction of a decoded video block, a variance in the direction, one or more filter taps, a filter strength, and a filter damping. Examples of operations performed by deringing filter 514 are discussed further in methods 600 and 800. For instance, method 800 relates to determining optimal strength parameters. Additionally, as discussed further herein, additional techniques can be used to further reduce computational complexity of determining strength parameters.

Examples of deringing filter 514 include, but are not limited to, a Sample Adaptive Offset Filter as used in the HEVC codec and a Constrained Directional Enhancement Filter (CDEF) as used in the AV1 codec. Continuing the example, deringing filter 514 receives block 503, filters block 503, and outputs final block 504.

uing the example, system 500 iterates over each block 502A-N in video frame 501, forming each of blocks 506A-N. When frame 505 is completed with all blocks 506A-N, then system 500 outputs frame 505, for instance, to a buffer or a display. The process can continue for subsequent frames.

FIG. 6 is a flowchart of an example of a method 600 for performing filtering of video by using an in-loop deringing filter. The operations of method 600 apply to both video encoding and video decoding. For example, method 600 can be applied to a reconstructed block within a video encoder or to a block of decoded video in a video decoder. The filtering discussed with respect to method 600 is adaptive, that is the operations discussed below are adjusted for each video block.

It should be appreciated that method 600 provides a particular method filtering video. Other sequences of operations may also be performed according to alternative examples. For example, alternative examples of the present invention may perform the steps outlined above in a different order. Moreover, the individual operations illustrated by method 600 may include multiple sub-operations that may be performed in various sequences as appropriate to the individual operation. Furthermore, additional operations may be added or removed depending on the particular applications. Further, the operations described in method 600 may be performed by different devices. One of ordinary skill in the art would recognize many variations, modifications, and alternatives.

At block 602, method 600 involves obtaining a direction and variance for a video block. Each video block will typically have a different associated direction and will therefore be filtered differently. The determined direction and variance for a given video block are used at block 606.

Directions in a video block exist due to pixels of the video block representing an edge. Edges can be formed by real-life objects represented in the video block such as a building, a plant, or a person's face. Block sizes should be configured such that curved edges can be handled and such that directions can be reliably determined. Examples of identified directions are shown in FIG. 7.

FIG. 7 illustrates different directions 700 identified in a video block. Directions 700 include examples 701-708, each of which has a different identified direction. The identified directions shown in examples 701-708 each have a respective code indicating the respective direction. For example purposes, these coded directions correspond to definitions AV1 standard, but other standards can be used. For example, example 701 has a code of d=0, example 702 has a code of d=1, example 703 a code of d=2, and so forth.

Variance represents a difference between a predetermined direction (e.g., d=0 . . . 7 as discussed above) and an actual determined direction. For example, a determined direction may differ slightly from a predetermined direction such as by a few degrees. The closest predetermined direction can be used, and the variance calculated relative to that predetermined direction.

In some embodiments, it can be assumed that a direction identified in a block of luminance pixels is the same as the corresponding block of chrominance pixels such that a direction need not be identified for a chrominance block. In other embodiments, a direction can be identified separately for chrominance and luminance.

Returning to FIG. 6, at block 604, method 600 involves accessing strength and damping for the video block. Strength and damping are set sufficiently high to smooth out coding artifacts but low enough to avoid blurring details in the image. In some cases, damping plays a smaller role in filtering as compared to strength.

In some embodiments, parameters such as strength and damping are predetermined. For example, strength and/or damping are accessed from a predefined list. In other embodiments, strength and/or damping are obtained from the bitstream generated by the video encoder. For instance, each decoded block could include one or more parameters embedded within. An example of determining a strength parameter is discussed further with respect to method 800 of FIG. 8.

Strength can be derived for a primary filter and, if used, for a secondary filter also. Determining these parameters can consume processing resources and can affect quality of sub-optimal parameters are selected. Strength and damping are independent of direction and variance as determined at block 602.

At block 606, method 600 involves applying one or more filters having the strength and dampening to the video block. At block 606, the video decoder filters the block of video according to the determined strength and damping, and consistent with the direction and variance.

A primary filter is typically applied. But in some cases, additional adaptive filtering (e.g., via a secondary filter) can be applied to the block following the primary filtering. If a secondary filter is used, then the secondary filter can be applied at a different direction than used with the primary filter. For example, the secondary filter can be applied at a direction rotated 45 degrees from the direction used by the primary filter.

At block 608, method 600 involves outputting the filtered video block. In some cases, the filtered video block is subject to additional post-processing. After any post-processing, the final block is assembled into a video frame with other blocks that correspond to the video frame.

Referring now to FIG. 8, FIG. 8 is a flowchart of an example of a method 800 for determining a strength parameter for use in in-loop filtering of video. Method 800 refers in more detail to operations that can be performed at block 604 of method 600.

Method 800 is appropriate for obtaining parameters for a CDEF but can also be used with AV1 or other standards. To accommodate requirements for other standards, a number of directions (as discussed at block 602), a size of the filtered block, and/or a size of the sub-blocks, and so forth can be adjusted.

It should be appreciated that method 800 provides a particular method for determining a strength parameter for use in in-loop filtering of video. Other sequences of operations may also be performed according to alternative examples. For example, alternative examples of the present invention may perform the steps outlined above in a different order. Moreover, the individual operations illustrated by method 800 may include multiple sub-operations that may be performed in various sequences as appropriate to the individual operation. Furthermore, additional operations may be added or removed depending on the particular applications. Further, the operations described in method 800 may be performed by different devices. One of ordinary skill in the art would recognize many variations, modifications, and alternatives.

As explained below, various operations are performed to determine the best filter strength parameters for a given video block. The optimum filter strength parameter for a first video block will typically not be the best filter strength parameter for a second video block, and so forth. Accordingly, operations performed at blocks 804-816 are repeated for each video block in a frame.

At block 802, method 800 involves obtaining, from a video stream, a block including a set of sub-blocks. Each video block can have an index that is be represented by i. In an example, each block of video includes M×M size luminance blocks, with each block having primary filter strength is p; and the secondary filter strength is $q_1$. Each M×M size block is divided into sub-blocks with dimensions P×P pixels. In an example, the dimensions M×M are 64×64 pixels and the dimensions P×P are 8×8 pixels.

At block 804, method 800 involves obtaining a candidate filter strength parameter from a set of candidate filter strength parameters. Many candidate filter strength parameters may be available.

In an embodiment, the candidate filter strengths are derived from one or more filter strengths associated with a luminance filter's primary or second filter strengths and/or a chrominance filter's primary or second filter strengths. For instance, a group of candidate filter strengths can include four luminance primary filter strengths, four luminance secondary filter strengths, four chrominance primary filter strengths, and four chrominance secondary filter strengths.

In some cases, offline calculations can be performed, and a set candidate filter strength parameter is determined that is suitable to a specific use case. Different types of video, such as video typically transmitted during video conferencing, can have different sets of candidate filter parameters which are optimum for that type of video. Then, at block 804, an appropriate set of candidate filter strength parameters is obtained.

In an embodiment, each M×M video block can have a respective set of candidate filter strengths for luminance and for chrominance. In other cases, candidate filter strengths can differ for luminance video blocks and chrominance video blocks.

In an embodiment, each block of pixels can have an index that points to one or more primary filter strengths for that block. For example, candidate strengths for the primary filter can be expressed as $S_1$, where $S_1=\{p_1, p_2, \ldots, p_N\}$, where $p_i (i \in [1, N])$ represents one of the primary filter's strengths. Similarly, candidate strengths for the secondary filter can be expressed as $S_2$, where $S_2=\{q_1, q_2, \ldots, q_N\}$, where $q_i$ ($i \in [1, N]$) represents one of the secondary filter's strengths.

In some embodiments, filter strength parameters can be derived from both the candidate strength values associated with the primary filter and candidate strength values associated with a secondary filter.

In some embodiments, to reduce processing time, the filter strengths can be derived directly from the Quantization Parameters (Qp) values. For example, the larger a Qp value is, the larger strength values are and the stronger the resulting filter. The relationship between strength parameters and Qp values is learned off-line using a custom training set. The relationship between strength parameters and Qp is not a linear function. Each Qp can correspond to a filter strength in a table.

In some cases, the larger the quantization parameter(Qp) is, the larger the high-frequency loss is, and the more serious the ringing artifacts can be. Therefore, a strong filter strength is useful when the Qp is large, and use a weak filter when Qp is small. Based on this idea. a table of filter strengths derived directly from Qp can be constructed. The relationship between filter strength and Qp is non-linear can be learned by training on custom datasets.

Therefore, in an embodiment, only one strength group can be used and no searching through candidate strengths is necessary. The Qp value of each frame is known to both the encoder and the decoder. Strength values from a frame-Qp are obtained from the table. In such a frame, all blocks use one strength group, including a primary filter strength for a luminance block, a secondary filter strength for a luminance block, a primary filter strength for a chrominance block, and a secondary filter strength for a chrominance block. Relative to search, this approach reduces complexity because parameters are obtained more quickly.

At block 806, method 800 involves filtering each sub-block of the set of sub blocks by using a filter having the candidate filter strength parameter. At block 806, operations are similar to those described at block 606 of method 600, with the difference that the operations are performed on a sub-block basis.

For example, for a given video block M×M, having a particular IDF_idx=i, then the filtering process is performed on each sub-block within the M×M block with strengths $p_i$ and $q_i$. Filtering of a given sub-block is performed according to the identified direction of the sub-block.

Each sub-block is filtered by a secondary filter. As discussed with respect to block 608, the secondary filter can have a direction that is 45 degrees different from that of the primary filter.

In some embodiments, to reduce processing time, the filtering as performed at block 806 is performed only on a subset of the total sub-blocks. In this example, a restricted number of rows (e.g., only odd rows or only even rows) of the input video block are used to form sub-blocks, rather than the entire video block as discussed above.

At block 808, method 800 involves creating a filtered block by combining the filtered sub blocks. The sub-blocks are combined into a filtered block having the original dimensions M×M.

At block 810, method 800 involves calculating, for the filtered block, a distortion error measurement between a source block and the filtered block. Different distortion error measurements are possible, such as the sum of square errors (SSE). Calculation of the error measurements involves comparing an error for the corresponding source block relative to the filtered block are generated based on the filtered block as compared to the source block. The source block refers to the corresponding original, uncompressed video block. The distortion of the M×M block's can be represented as Di.

In some embodiments, to reduce processing time, error measurements calculated at block 810 can include only error measurements of odd (or even) rows of the filtered block as compared to the original block. For example, an error can be calculated by comparing an error for a row of the corresponding source block and relative to a row of the filtered block.

In other embodiments, to increase processing speed, the search for the filter parameters yielding the lowest distortion is terminated early when the current distortion is larger than the last minimum distortion. For example, for a particular block, the video encoder can determine that the distortion error measurement for the current block is greater than a threshold. The threshold can be associated with one or more previous filtered blocks. Based on the determining, the video encoder can select the previous filtered video block having the error measurement lower than a threshold as the best match and move to block 814.

At block 812, method 800 involves determining whether any more candidate filter strength parameters exist. If additional candidate filter parameters exist, then method 800 returns to block 804 and processes the next available block. If no additional candidate filter parameters exist, then method 800 proceeds to block 814.

At block 814, method 800 involves selecting the candidate filter strength parameter. For example, if the M×M block with index i=2 has a lowest error, then the video encoder selects the filtered block associated with i=2 is selected and is used at block 816.

One or more of blocks 816-818 can be executed. For instance, block 816 may be executed by a video encoder. Block 818 may be executed by a video encoder or a video decoder.

At block 816, method 800 involves transmitting, with the video stream, the selected candidate filter strength parameter. The resulting bitstream, including the determined strength parameters, is transmitted. Then, a decoder can access the signaled strength parameters for use in decoding.

At block 818, the decoder applies the selected filter strength parameters to an in-loop deringing filter. Applying the selected parameters to the in-loop deringing filter includes filtering the block with the strength parameters and outputting the filtered video block, for example, to a memory buffer. In some implementations, the filtered video block may have already been calculated (e.g., at block 808). In this case, it need not be calculated again.

In some embodiments, strength parameters can be used for both chrominance and luminance. For example, method 800 is completed to obtain the strength parameters and applied to luminance video blocks. Then, the video decoder accesses a chrominance component associated with the luminance component from the video stream. The chrominance component can include chrominance blocks having chrominance sub-blocks. The video decoder filter each chrominance sub-block using the filter having the candidate filter strength parameter. The video coder creates a filtered chrominance block by combining the filtered chrominance sub-blocks.

Performance of disclosed techniques can be measured by a Bjontegaard delta rate. The Bjontegaard delta rate allows the measurement of the bitrate reduction offered by a codec or codec feature while maintaining the same quality as measured by objective metrics. As compared to no in-loop deringing filter, disclosed solutions yield a 10% Bjontegaard delta rate (BD) gain and a 4% frame-per-second loss in video conferencing use cases. Disclosed improvements can be obtained on via the Sample Adaptive Offset Filter as used in HEVC and the Constrained Directional Enhancement Filter (CDEF) as used in the AOMedia Video 1 (AV1) codec. In some cases, to reduce a number of searches, an error-speed tradeoff is made between different strength candidates groups. Some filter strength candidates may be a trade-off between speed and performance.

Figure 9:
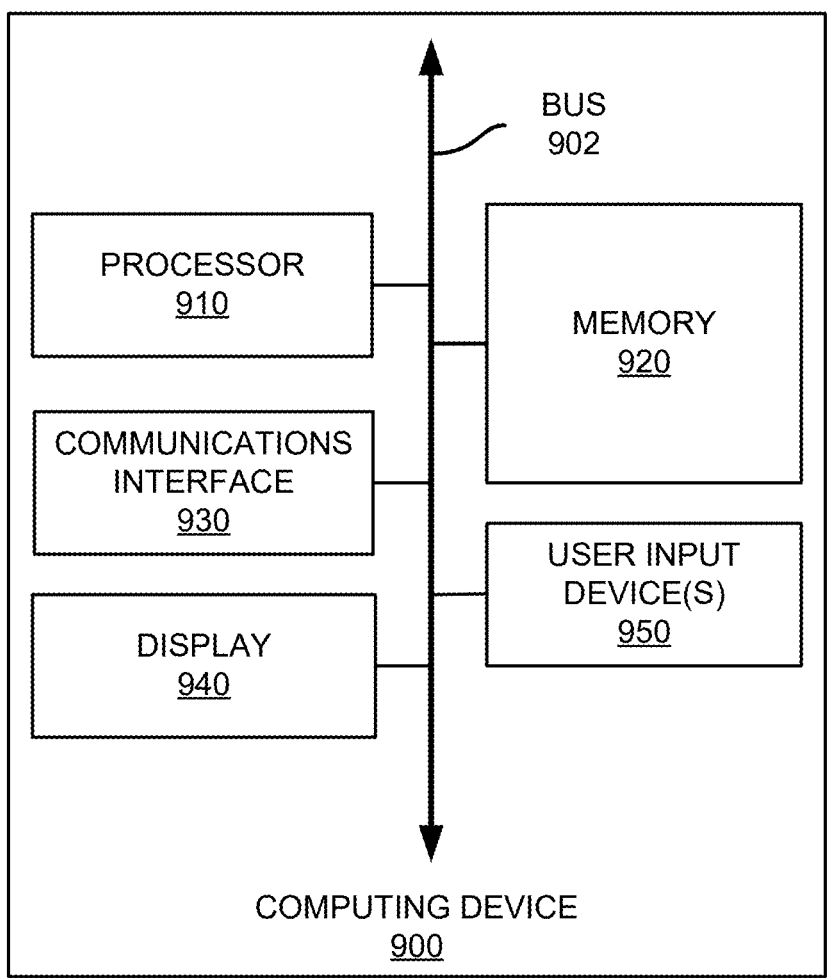
FIG. 9 illustrates an example computing device for providing video conferencing functionality.

FIG. 9 illustrates an example computing device for pro-viding video conferencing functionality. Computing device 900 is suitable for use in example systems or methods described herein. Computing device 900 includes a proces-sor 910 which is in communication with the memory 920 and other components of the computing device 900 using one or more communications buses 902.

The processor 910 is configured to execute processor-executable instructions stored in the memory 920 to perform one or more methods described herein, such as part or all of methods 600 and 800, described above. The computing device, in this example, also includes one or more user input devices 950, such as a keyboard, mouse, touchscreen, video input device (e.g., one or more cameras), microphone, etc., to accept user input. The computing device 900 also includes a display 940 to provide visual output to a user.

The computing device 900 also includes a communica-tions interface 930. In some examples, the communications interface 930 may enable communications using one or more networks, including a local area network ("LAN"); wide area network ("WAN"), such as the Internet; metro-politan area network ("MAN"); point-to-point or peer-to-peer connection; etc. Communication with other devices may be accomplished using any suitable networking proto-col. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be imple-mented as specifically-configured hardware, such as field-programmable gate array (FPGA) specifically to execute the various methods according to this disclosure. For example, examples can be implemented in digital electronic circuitry, or in computer hardware, firmware, software, or in a com-bination thereof. In one example, a device may include a processor or processors. The processor comprises a com-puter-readable medium, such as a random access memory (RAM) coupled to the processor. The processor executes processor-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, program-mable interrupt controllers (PICs), programmable logic devices (PLDs), programmable read-only memories (PROMs), electronically programmable read-only memories (EPROMs or EEPROMs), or other similar devices.

Such processors may comprise, or may be in communi-cation with, media, for example one or more non-transitory computer-readable media, that may store processor-execut-able instructions that, when executed by the processor, can cause the processor to perform methods according to this disclosure as carried out, or assisted, by a processor. Examples of non-transitory computer-readable medium may include, but are not limited to, an electronic, optical, mag-netic, or other storage device capable of providing a pro-cessor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other char-acteristic described in connection with the example may be included in at least one implementation of the disclosure. The disclosure is not restricted to the particular examples or implementations described as such. The appearance of the phrases "in one example," "in an example," "in one imple-mentation," or "in an implementation," or variations of the same in various places in the specification does not neces-sarily refer to the same example or implementation. Any particular feature, structure, operation, or other characteris-tic described in this specification in relation to one example or implementation may be combined with other features, structures, operations, or other characteristics described in respect of any other example or implementation.

Use herein of the word "of" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Illustration 1 is a method for filtering artifacts from digital video, the method including: accessing a video stream, the video stream includes a block including a plurality of sub-blocks; for each candidate filter strength parameter of a set of candidate filter strength parameters associated with the block: filtering each sub-block of the plurality of sub-blocks using a filter having the candidate filter strength parameter; creating a filtered block by combining the filtered sub-blocks; and calculating, for the filtered block, a distortion error measurement between a corresponding source block and the filtered block; selecting the candidate filter strength parameter associated with a lowest distortion error measure-ment of the distortion error measurements; and applying the selected filter strength parameter to an in-loop deringing filter to generate a filtered block of video.

Illustration 2 is the method of any previous or subsequent illustration, where applying the selected filter strength parameters to the in-loop deringing filter includes: filtering the block with the selected filter strength parameter; and outputting the filtered block of video.

Illustration 3 is the method of any previous or subsequent illustration, where the plurality of sub-blocks represent at least a 4×4 block.

Illustration 4 is the method of any previous or subsequent illustration, where the calculating the distortion error measurement includes calculating an error for a portion of a sub-block.

Illustration 5 is the method of any previous or subsequent illustration, where each block represents a luminance component of the video stream, where the applying further includes: accessing, from the video stream, a chrominance component associated with the luminance component, the chrominance component including a chrominance block including a plurality of chrominance sub-blocks; filtering each chrominance sub-block of the plurality of chrominance sub-blocks using the filter having the candidate filter strength parameter; creating a filtered chrominance block by combining the filtered chrominance sub-blocks; and outputting the filtered chrominance block.

Illustration 6 is the method of any previous or subsequent illustration, where calculating, for the filtered block, the distortion error measurement further includes: determining that the distortion error measurement is greater than a threshold associated with a previously filtered block; and responsive to the determining, outputting previous filter parameters associated with the previously filtered block.

Illustration 7 is the method of any previous or subsequent illustration, where the set of candidate filter strength parameters includes a single filter parameter derived from one or more quantization parameters of the block.

The above examples may be implemented on a system including a processor and/or on a non-transitory computer-readable medium. These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

That which is claimed is:

1. A method for filtering artifacts from digital video, the method comprising:
   accessing a video stream, wherein the video stream comprises a block comprising a plurality of sub-blocks;
   for each candidate filter strength parameter of a set of candidate filter strength parameters associated with the block:
      filtering each sub-block of the plurality of sub-blocks using a filter having the candidate filter strength parameter;
      creating a filtered block by combining the filtered sub-blocks; and
      calculating, for the filtered block, a distortion error measurement between a corresponding source block and the filtered block;
   selecting the candidate filter strength parameter associated with a lowest distortion error measurement of the distortion error measurements; and
   applying the selected filter strength parameter to an in-loop deringing filter to generate a filtered block of video.

2. The method of claim 1, wherein applying the selected filter strength parameters to the in-loop deringing filter comprises:
   filtering the block with the selected filter strength parameter; and
   outputting the filtered block of video.

3. The method of claim 1, wherein the plurality of sub-blocks represents at least a 4×4 block.

4. The method of claim 1, wherein the calculating the distortion error measurement comprises calculating an error for a portion of a sub-block.

5. The method of claim 1, wherein each block represents a luminance component of the video stream, wherein the applying further comprises:
   accessing, from the video stream, a chrominance component associated with the luminance component, the chrominance component comprising a chrominance block comprising a plurality of chrominance sub-blocks;
   filtering each chrominance sub-block of the plurality of chrominance sub-blocks using the filter having the candidate filter strength parameter;
   creating a filtered chrominance block by combining the filtered chrominance sub-blocks; and
   outputting the filtered chrominance block.

6. The method of claim 1, wherein calculating, for the filtered block, the distortion error measurement further comprises:
   determining that the distortion error measurement is greater than a threshold associated with a previously filtered block; and
   responsive to the determining, outputting previous filter parameters associated with the previously filtered block.

7. The method of claim 1, wherein the set of candidate filter strength parameters comprises a single filter parameter derived from one or more quantization parameters of the block.

8. A system comprising:
   a non-transitory computer-readable medium storing processor-executable program instructions; and
   one or more processors communicatively coupled to the non-transitory computer-readable medium and configured to execute processor-executable program instructions stored in the non-transitory computer-readable medium to:
   access a video stream, wherein the video stream comprises a block comprising a plurality of sub-blocks;
   for each candidate filter strength parameter of a set of candidate filter strength parameters associated with the block:
      filter each sub-block of the plurality of sub-blocks using a filter having the candidate filter strength parameter;
      create a filtered block by combining the filtered sub-blocks; and
      calculate, for the filtered block, a distortion error measurement between a corresponding source block and the filtered block;
   select the candidate filter strength parameter associated with a lowest distortion error measurement of the distortion error measurements; and
   apply the selected filter strength parameter to an in-loop deringing filter to generate a filtered block of video.

9. The system of claim 8, wherein the one or more processors are configured to execute further processor-executable program instructions to:
   filter the block with the selected filter strength parameter; and
   output the filtered block of video.

10. The system of claim 8, wherein the plurality of sub-blocks represents at least a 4×4 block.

11. The system of claim 8, wherein the one or more processors are configured to execute further processor-executable program instructions to calculate an error for a portion of a sub-block.

12. The system of claim 8, wherein each block represents a luminance component of the video stream, wherein the one or more processors are configured to execute further processor-executable program instructions to:

access, from the video stream, a chrominance component associated with the luminance component, the chrominance component comprising a chrominance block comprising a plurality of chrominance sub-blocks;

filter each chrominance sub-block of the plurality of chrominance sub-blocks using the filter having the candidate filter strength parameter;

create a filtered chrominance block by combining the filtered chrominance sub-blocks; and output the filtered chrominance block.

13. The system of claim 8, wherein the one or more processors are configured to execute further processo-executable program instructions to:

determing that the distortion error measurement is greater than a threshold associated with a previously filtered block; and responsive to the determining, output previous filter parameters associated with the previously filtered block.

14. The system of claim 8, wherein the set of candidate filter strength parameters comprises a single filter parameter derived from one or more quantization parameters of the block.

15. A non-transitory computer-readable medium comprising processor-executable instructions:

access a video stream, wherein the video stream comprises a block comprising a plurality of sub-blocks;

for each candidate filter strength parameter of a set of candidate filter strength parameters associated with the block:

filter each sub-block of the plurality of sub-blocks using a filter having the candidate filter strength parameter;

create a filtered block by combining the filtered sub-blocks; and calculate, for the filtered block, a distortion error measurement between a corresponding source block and the filtered block;

select the candidate filter strength parameter associated with a lowest distortion error measurement of the distortion error measurements; and apply the selected filter strength parameter to an in-loop deringing filter to generate a filtered block of video.

16. The non-transitory computer-readable medium of claim 15, further comprising processor-executable instructions configured to cause the one or more processors to:

filter the block with the selected filter strength parameter; and output the filtered block of video.

17. The non-transitory computer-readable medium of claim 15, wherein the plurality of sub-blocks represents at least a 4×4 block.

18. The non-transitory computer-readable medium of claim 15, further comprising processor-executable instructions configured to cause the one or more processors to calculate an error for a portion of a sub-block.

19. The non-transitory computer-readable medium of claim 15, wherein each block represents a luminance component of the video stream, further comprising processor-executable instructions configured to cause the one or more processors to:

access, from the video stream, a chrominance component associated with the luminance component, the chrominance component comprising a chrominance block comprising a plurality of chrominance sub-blocks;

filter each chrominance sub-block of the plurality of chrominance sub-blocks using the filter having the candidate filter strength parameter;

create a filtered chrominance block by combining the filtered chrominance sub-blocks; and outputting the filtered chrominance block.

20. The non-transitory computer-readable medium of claim 15, further comprising processor-executable instructions configured to cause the one or more processors to:

determine that the distortion error measurement is greater than a threshold associated with a previously filtered block; and responsive to the determining, output previous filter parameters associated with the previously filtered block.

*     *     *     *     *